Dec. 11, 1928.

M. J. DOWNEY 1,695,183

PORTABLE ASH CAN TRUCK

Filed April 13, 1926

Inventor
Michael J. Downey
by Chapin & Neal
his Attorneys

Patented Dec. 11, 1928.

1,695,183

UNITED STATES PATENT OFFICE.

MICHAEL J. DOWNEY, OF SPRINGFIELD, MASSACHUSETTS.

PORTABLE ASH-CAN TRUCK.

Application filed April 13, 1926. Serial No. 101,823.

This invention relates to improvements in portable wheeled trucks for moving loaded ash cans or barrels from place to place, with the least effort, to avoid rolling of the cans or barrels over floors and to minimize the danger of spilling the ashes or other contents of the cans or barrels.

One of the objects of the invention is the provision of a small, light, portable wheeled truck, which can be carried into and out of a home or building, by a workman engaged in removing ashes, and readily manipulated to carry a loaded ash can or barrel, by first rolling the can or barrel on the frame of the truck and then rolling the truck over the ground by pushing the can or barrel.

With the above and other objects in view the invention consists in certain new and useful constructions, combinations, and arrangements of parts, clearly described in the following specification, and fully illustrated in the accompanying drawings, in which:—

Fig. 4 is a transverse sectional, elevational view through the body of the truck shown in Fig. 3.

Figure 1:
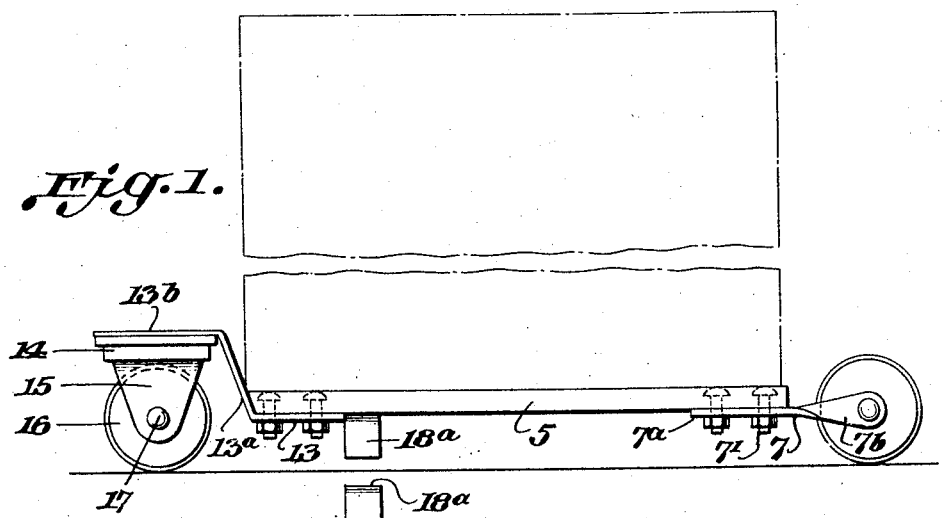
Fig. 1 is a side elevational view of a truck embodying the features of my invention and showing an ash can or barrel in dotted lines supported thereby.

Referring to the accompanying drawings illustrating the practial construction of my invention 5 designates a frame in the form of a flat board, with parallel sides.

A frame bar 7 is provided with a flat end portion 7ª which is secured by the bolts 7' to the board frame 5, and a flat end portion 7ᵇ, which is twisted into a normal vertical plane and which extends outwardly of the end of the board frame. A frame bar 8 is also constructed with a flat end portion 8ª, which is directly connected to the frame 5 by the bolts 8', and a flat end portion 8ᵇ, which is twisted to a normal vertical plane, and which extends outwardly of the frame 5.

The outer end portions 7ᵇ and 8ᵇ are spaced apart and are provided with terminal bearing holes to receive an axle 9, which carries rubber tired ground load carrying wheels 10 and 11, for free rotation. The hubs of these wheels are spaced apart by means of a spacing sleeve 12, positioned on the axle.

The strap bars 7 and 8 may be secured to either side of the frame 5, but are shown to be secured to the underside of the frame.

The forward end of the frame is bolted to a flat metal strap 13, which is formed with an upwardly and forwardly inclined portion 13ª, and a forwardly extending substantially horizontal portion 13ᵇ, which is located at a relatively higher elevation than the frame 5.

A plate 14 having a caster bracket 15 swivelled therein is secured to the horizontal portion 13ᵇ of the strap 13 and a wheel 16 is journalled on a shaft 17 of the bracket 15. The parts are adapted and arranged to support the truck and its load and at the same time allow a free swivelling action of the swivel bracket and a rotation of the wheel as the truck is moved about.

The rear wheels 10 and 11 are spaced apart a relatively slight distance, and the frame 5 is relatively narrow, having a width considerably less than that of the bottom of a standard ash holding can or barrel. With this construction lightness and portability is obtained, but when a loaded ash can or barrel is placed on the frame 5 there is a tendency of the truck to tip to one side or the other, thus endangering the position of the loaded ash can.

To prevent spilling of the contents of the can or barrel, I arrange a cross arm 18 on the frame 5, by means of the attaching bolts 19, and provide terminal lugs 18ª on the ends of this cross arm to support the barrel and the truck against extreme tilting. The terminal lugs are adapted to alternately engage the ground when the truck is tilted too far from a normally safe horizontal position. The cross arm 18 is bolted against the rear edge of the bracket plate 13, to secure maximum rigidity. A single bolt may be used for connecting the cross arm to the frame, and by loosening the nut on this bolt the cross arm may be swung to a position in parallel relation to the frame.

Figure 3:
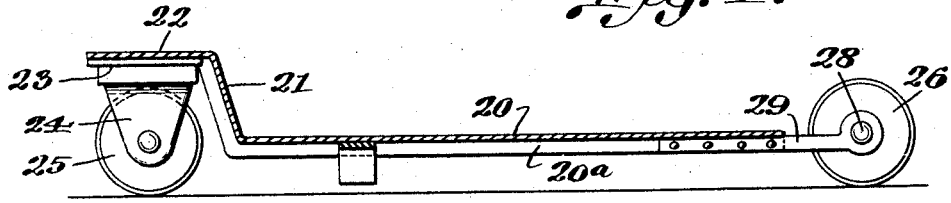
Fig. 3 is a longitudinal sectional view showing a modified form of the invention.

In Figs. 3 and 4 I show a modified construction, wherein a channel metal frame is employed. This frame 20 is formed of a U-shaped channel steel or other rigid metal, to provide parallel side flanges 20ª and 20ᵇ.

The channel frame 20 is bent upwardly at 21 and then forwardly at 22 to provide a horizontal bracket arm capable of carrying the swivel head 23, to which a caster holding bracket 24 is swiveled. This bracket 24 supports a wheel 25 in normal vertical relation to the truck, in the manner described with reference to the previously described form of invention. The swivel head 23 may be riveted or bolted directly to the bracket arm 22.

Figure 2:
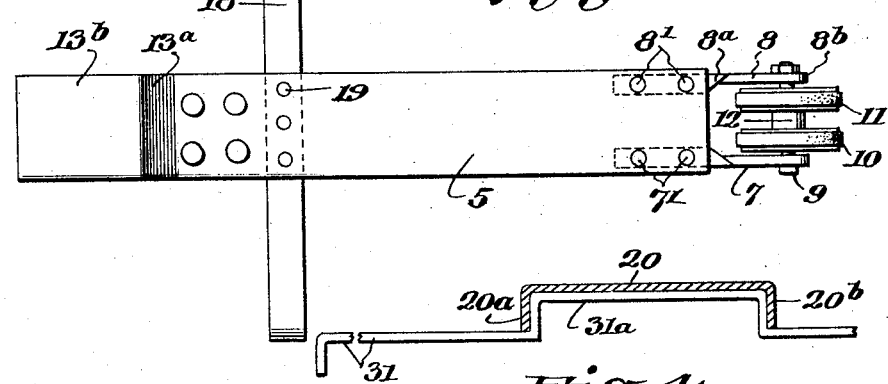
Fig. 2 is a plan view of the same.

A pair of wheels 26 are spaced apart similar to the manner shown in Fig. 2 and journalled for free rotation on a shaft 28 which is carried between a pair of spaced brackets 29 suitably fixed to the flanges $20^a$ and $20^b$ of the member 20, all being adapted for supporting an end of the truck. The brackets 7 and 8 and 29 are secured to their respective frames so as to be integral therewith and form a rigid substantial structure.

A cross arm 31 is also welded to the channel frame 20, and for this purpose the central portion of this cross arm is provided with a U-shaped bend $31^a$ which fits between the flanges $20^a$ and $20^b$ of the channel frame 20.

My improved device simplifies the work of handling loaded ash cans and also loaded barrels or cans containing other materials. The can or barrel is rolled upon the frame and then held by the workman in the proper vertical position, while the truck and the load thereon are propelled over the ground by pushing on the can or barrel.

Having described my invention I claim and desire to secure by Letters Patent:—

A portable truck for handling ash cans consisting of a frame having a pair of bracket arms extending rearwardly thereof, the frame consisting of a U-shaped metal channel providing side flanges, the bracket arms being secured to said side flanges, an axle mounted on the bracket arms, a pair of wheels mounted on the axle, an upwardly and forwardly extending bracket arm on the forward end of the frame, a caster bracket swiveled to the last named bracket arm, a caster wheel mounted on the caster bracket, and a cross arm secured to the frame rearwardly of the caster to limit the degree of tilting of the frame and its load, the cross arm having pendant lugs.

In testimony whereof I affix my signature.

MICHAEL J. DOWNEY.